United States Patent [19]

Flotow

[11] Patent Number: 4,657,124

[45] Date of Patent: Apr. 14, 1987

[54] CLUTCH BRAKE NOISE SUPPRESSOR

[75] Inventor: Richard A. Flotow, Butler, Ind.

[73] Assignee: Dana Corporation, Toledo, Ohio

[21] Appl. No.: 785,915

[22] Filed: Oct. 9, 1985

[51] Int. Cl.[4] .............................................. F16D 67/02
[52] U.S. Cl. ................................. 192/13 R; 192/18 R; 192/30 V; 192/107 C
[58] Field of Search ................. 192/18 R, 7, 15, 13 R, 192/30 V, 107 C, 98; 464/160, 161; 188/73.38, 218 A; 403/359

[56] References Cited

U.S. PATENT DOCUMENTS

| | | | |
|---|---|---|---|
| 2,636,363 | 4/1953 | Nutt | 464/68 |
| 2,749,842 | 6/1956 | Angell et al. | 103/17 |
| 2,863,537 | 12/1958 | Root | 192/18 R X |
| 2,886,380 | 5/1959 | Lambeek | 308/72 |
| 3,179,217 | 4/1965 | Root | 192/98 X |
| 3,266,790 | 8/1966 | Bradeen | 267/1 |
| 3,591,162 | 7/1971 | Bauer | 267/161 |
| 3,620,339 | 11/1971 | Becking | 192/84 A |
| 3,763,977 | 10/1973 | Sink | 192/7 |
| 4,043,437 | 8/1977 | Taylor | 192/13 R |
| 4,046,237 | 9/1977 | Root et al. | 192/13 R |
| 4,186,826 | 2/1980 | MacKendrick et al. | 192/13 R |
| 4,285,054 | 8/1981 | McNeel | 367/183 |

FOREIGN PATENT DOCUMENTS 2109499  6/1983  United Kingdom ............. 192/13 R

Primary Examiner—Kenneth J. Dorner
Assistant Examiner—Richard M. Lorence
Attorney, Agent, or Firm—Willian Brinks Olds Hofer Gilson & Lione

[57] ABSTRACT

A clutch brake for use with non-synchronized vehicle transmissions includes noise suppression components. The clutch brake comprises a pair of housing members secured together which receive components of a torque limiting assembly. The assembly includes an inner ring member adapted to rotationally engage the transmission drive shaft and which is coupled to a concentric, outer ring member through a lost motion coupling. The outer ring, in turn, is frictionally coupled to the housing by an adjacent wave spring which includes inwardly directed tabs. The tabs exert a biasing force against the inner ring member, inhibiting wholly unrestricted motion which might generate undesirable vibration and noise.

17 Claims, 5 Drawing Figures

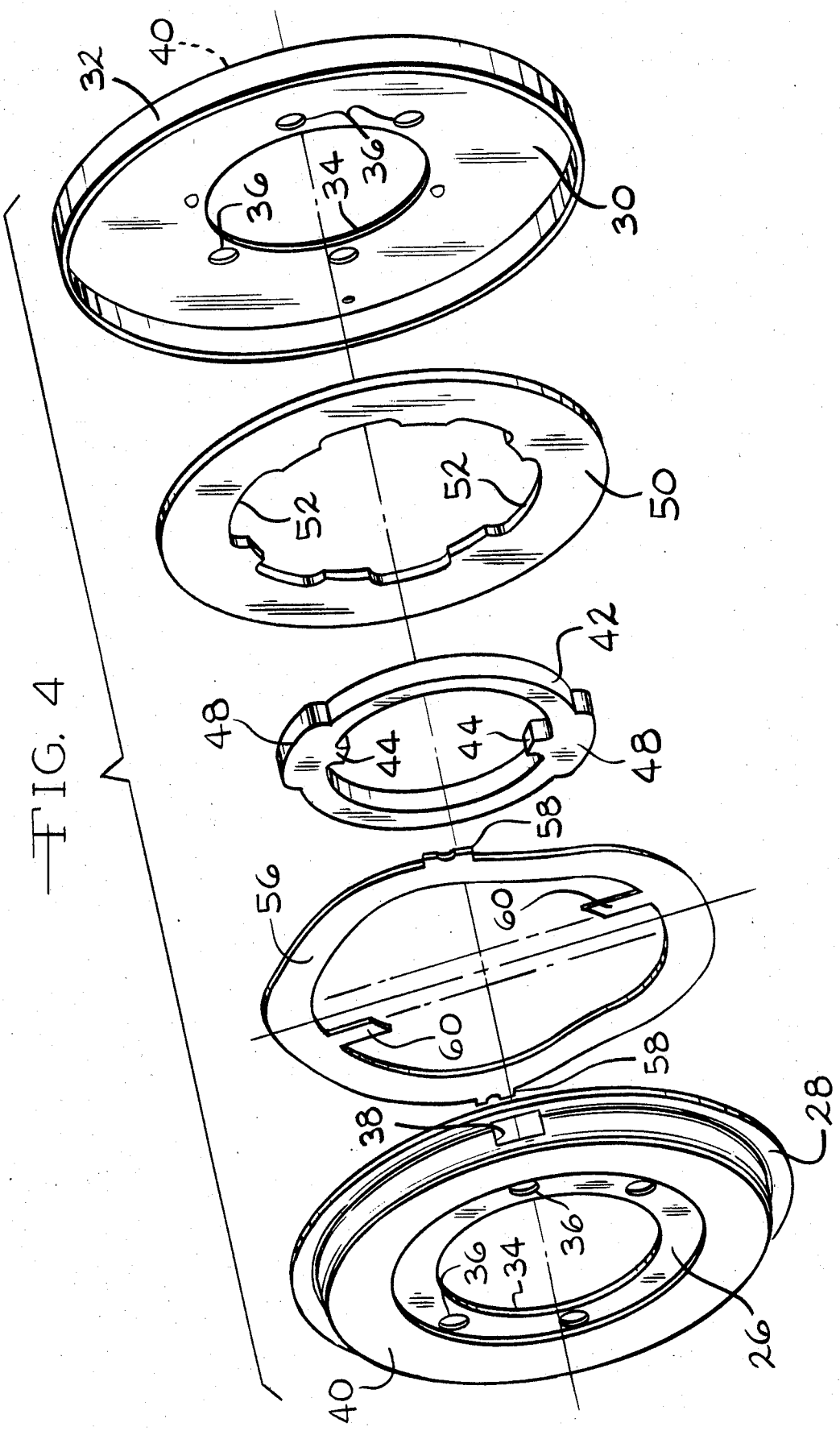

CLUTCH BRAKE NOISE SUPPRESSOR

BACKGROUND OF THE INVENTION

This invention relates generally to friction clutches used in vehicles and more particularly to clutch brakes utilized in non-synchronized heavy-duty transmissions. Such brakes are activated upon disengagement of a main clutch to retard rotation of transmission gearing for easier gear shifting.

It is well known in the art to retard vehicle transmission gears prior to gear shifting by using a clutch brake activated by the throw-out mechanism which disengages the main clutch. Torque limiting clutch brakes which provide a limited amount of braking torque are also well known, and are widely preferred because of their durability and long life.

Resilient means have been used in torque limiting clutch brakes to cushion the braking effect and to prevent excessive braking pressure which may damage the clutch brake. For example, prior art devices have included opposed Belleville springs for establishing a predetermined frictional load between the inner and outer members of clutch brakes. Clutches utilizing opposed Belleville springs must be carefully designed and accurately assembled in order that one spring balances the other. An imbalance between the springs can cause one to overcome the other, reversing its concavity and interfering with the operation of and shortening the life of the clutch brake.

SUMMARY OF THE INVENTION

The present invention relates to a clutch brake for use with non-synchronized vehicle transmissions which includes noise suppression components. The clutch brake comprises a pair of generally circular housing members which are secured together and receive components of a torque limiting assembly. The torque limiting assembly includes an inner ring member having at least a pair of tabs or similar structures which are adapted to rotationally engage the transmission drive shaft. The inner ring member is coupled to a concentrically disposed outer ring member through a lost motion coupling. The outer ring is frictionally coupled to the housing by an axially adjacent wave spring which includes a pair of inwardly directed tabs. The tabs exert a biasing force against the inner ring member which inhibits wholly unrestricted motion that might generate undesirable vibration and noise. The outer surfaces of the housing include friction facing material. An alternate embodiment further includes a second wave spring disposed within the housing on the side of the outer ring opposite the first wave spring.

Thus it is an object of the instant invention to provide a clutch brake having means to eliminate wholly unrestricted motion of the inner member of the torque limiting assembly of a clutch brake.

It is a further object of the instant invention to provide a clutch brake having a single wave spring which includes inwardly directed tabs for engaging the inner ring member of the torque limiting assembly to inhibit wholly unrestricted motion thereof.

Further objects and advantages of the present invention will become apparent by reference to the following description of the preferred and alternate embodiments and appended drawings.

BRIEF DESCRIPTION OF THE DRAWINGS

FIG. 4 is an exploded isometric view of the clutch brake according to the present invention.

DESCRIPTION OF PREFERRED EMBODIMENTS

Figure 1:
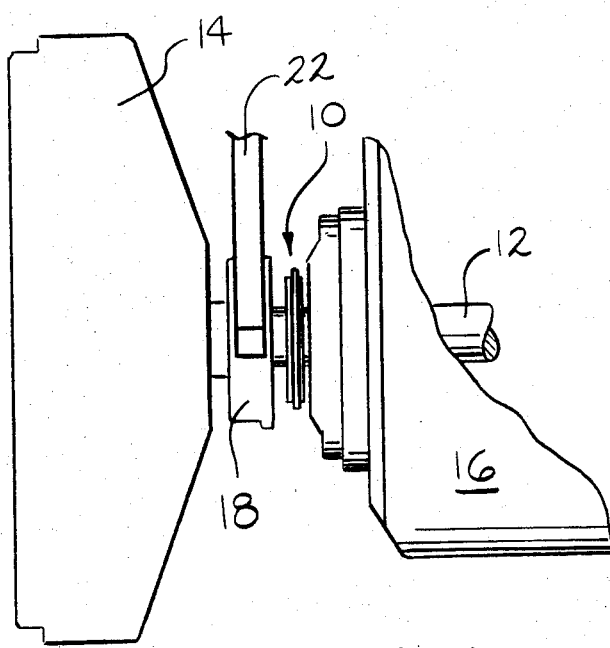
FIG. 1 is a diagrammatic view of a clutch brake according to the present invention illustrated in association with cooperating driveline components of a vehicle.

Referring now to FIG. 1, a clutch brake assembly according to the present invention is illustrated and generally designated by the reference numeral 10. The clutch brake assembly 10 is illustrated in position on associated drive line components of a vehicle (not illustrated). Specifically, the clutch brake assembly 10 is disposed upon a drive shaft 12 which extends from a conventional pull-type friction clutch 14 to a non-synchronized vehicle transmission 16. The drive shaft 12 is rotatably supported by suitable bearings, typically anti-friction bearings (not illustrated) in the housings of the friction clutch 14 and transmission 16. The drive shaft 12 transfers power from the driven components of the clutch 14 when they are engaged to gear ratio selecting components within the transmission 16 according to conventional practice. Positioned intermediate the clutch brake assembly 10 and the housing of the friction clutch 14 and slidably disposed upon the drive shaft 12 is a clutch release bearing 18. The clutch release bearing 18 may be operated by a conventional clutch linkage 22 which disengages the friction clutch 14 by translating the release bearing 18 away from the housing of the friction clutch 14, toward the clutch brake assembly 10 according to conventional practice.

Figure 2:
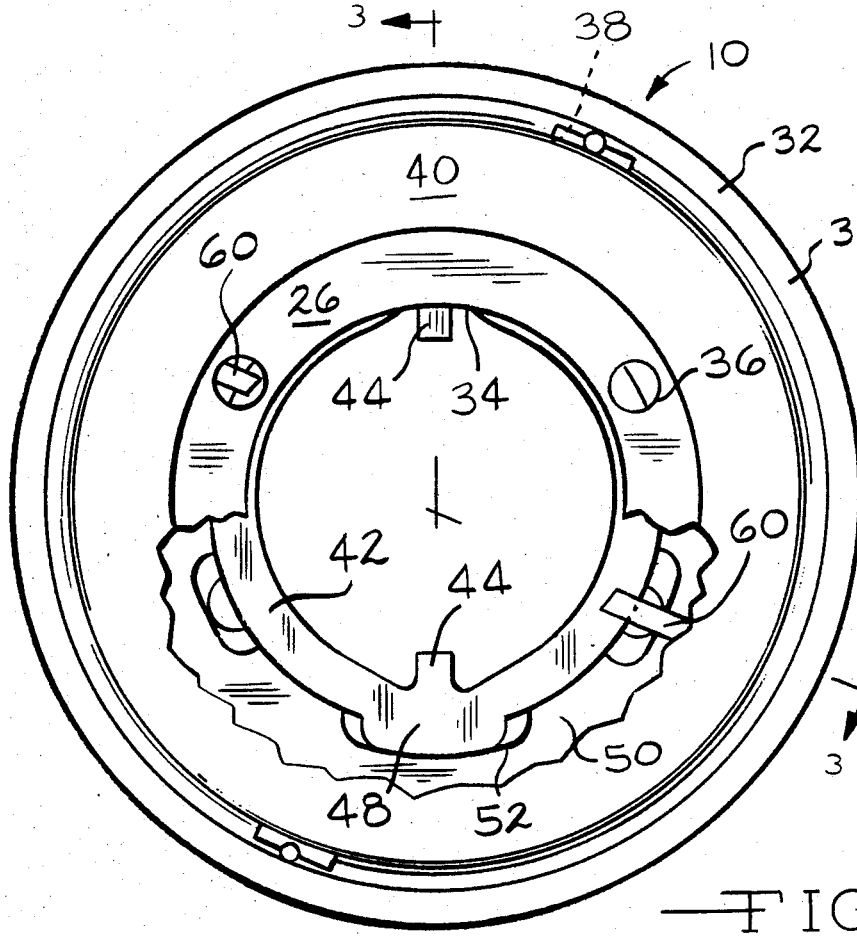
FIG. 2 is a front, elevational view of the clutch brake according to the present invention with portions broken away.
Figure 3:
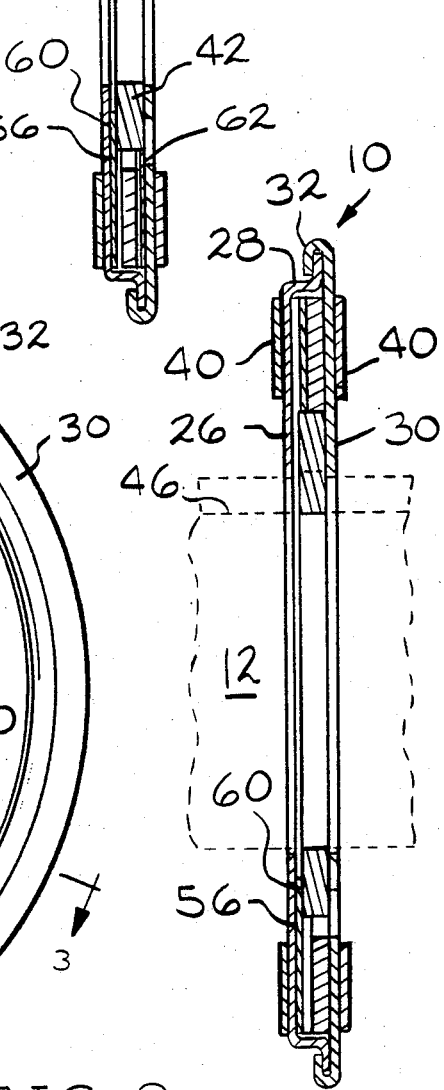
FIG. 3 is a sectional view taken along line 3—3 of FIG. 2.

Referring now to FIGS. 2, 3 and 4, the clutch brake assembly 10 defines a disc-like housing comprising a first circular housing member 26 having a radially extending peripheral shoulder 28 and a second circular housing member 30 having an axially extending peripheral lip 32. When assembled, the peripheral lip 32 is rolled over the peripheral shoulder 28 of the first housing member 26, thereby tightly and positively securing the two housing members together. The housing members 26 and 30 may, alternatively, be secured by welding, fasteners, or other suitable, similar means. Both housing members 26 and 30 define a centrally disposed aperture 34 which receives the drive shaft 28 and a plurality, preferably four, of smaller apertures 36 disposed adjacent each central aperture 34. As illustrated in FIG. 2, the smaller apertures 36 are arranged in axial alignment when the first housing member 26 and second housing member 30 are assembled. The first housing member 26 also defines a pair of diametrically opposed rectangular openings 38, one of which is illustrated in FIG. 4. Finally, the housing members 26 and 30 both include organic friction facings 40 on their outer faces. The facings 40 may be bound to the housing members 26 and 30 in any of several ways, such as adhesive, well known in the art. The friction facings 40 are disposed for frictional engagement with adjacent surfaces on the release bearing 18 and housing of the transmission 16.

Within the housing members 26 and 30 are the operative components of the clutch brake assembly 10. They include a first, inner annulus or ring member 42. The first ring member 42 preferably includes a pair of diametrically opposed lugs 44 which are received within and engage complementarily disposed channels 46 formed in the drive shaft 12. The lugs 44 thus rotationally couple the inner ring member 42 to the drive shaft 12 while permitting axially unrestricted motion relative thereto. Formed in the periphery of the inner ring member 42 are a second pair of diametrically opposed lugs 48.

A second, outer annulus or ring member 50 is disposed concentrically about the inner ring member 42. The outer ring member 50 defines an inner marginal edge defining a plurality of slots, at least a pair of diametrically opposed slots 52 being generally complementarily to and receiving the lugs 48 on the inner ring member 42. The slots 52, however, are elongated, that is, longer than the circumferential length of the lugs 48 and thus their alternate bi-directional engagement exhibits several angular degrees of lost motion. This lost motion or rotational free travel between the inner ring member 42 and the outer ring member 50 exists because the lugs 48 have a shorter circumferential length than the elongated slots 52. The outer ring member 50 is fabricated of powdered metal having appropriate frictional and heat sink characteristics. A preferred material is an oil based powdered metal, such as SN-0205, which facilitates slippage with the frictional members after a predetermined torque is reached. Other oil based materials such as special oil based steels as well as glass filled synthetic resin, for example, may also be used.

The preferred embodiment clutch assembly 10 also includes a single axially resilient wave spring or wave washer 56. The wave washer 56 is preferably fabricated of steel which has been hard tempered to a Rockwell C hardness of between 40 and 48. The wave washer 56 defines four circumferentially equally spaced waves and provides a biasing force against the outer ring member 50 to maintain it in intimate, frictional engagement with the inner surface of the second housing member 30. The wave washer 56 includes a pair of diametrically opposed, radially outwardly projecting tabs 58. The tabs 58 register with the pair of diametrically opposed rectangular openings 38 in the first housing member 26 thereby rotationally securing these components together. The wave washer 56 further includes a pair of inwardly projecting lugs or tabs 60. The tabs 60 conform to the contour of the wave at their locations. The tabs 60 are disposed in parallel to one another and to a centrally disposed line or diameter and are equally spaced and laterally offset therefrom as illustrated in FIG. 4. The inner marginal edges of the tabs 60 conform to a circle but, since they are offset from radial or diametral lines, the end surface is obliquely curved. The tabs 60 extend inwardly and terminate approximately at the radial middle of the inner ring member 42 as illustrated in FIG. 2. As also noted in FIG. 2, the apertures 36 provide an open region adjacent each of the wave washer tabs 60 such that they may deform axially. The tabs 60 provide a biasing force against the inner ring member 42 which, in turn, biases it toward the second housing member 30. This biasing force and the resulting position of the inner ring member 42 inhibits wholly unrestricted free motion of the ring member 42 to an extent sufficient to preclude the generation of noise. The biasing force of the tabs 60 is of a magnitude small enough that it does not interfere with the rotational action of the lost motion coupling between the inner ring member 42 and the outer ring member 50.

In operation, the clutch brake assembly 10 functions in a substantially conventional manner. That is, when the release bearing 18 is activated by the clutch linkage 22 and moved toward the clutch brake assembly 10, the friction facings 40 frictionally engage adjacent surfaces of the release bearing 18 and housing of the transmission 16 thereby restraining the housing members 26 and 30 of the clutch brake assembly 10. The wave washer 56 which rotates with the housing members 26 and 30 provides a controlled frictional interconnection between it and the adjacent outer ring member 50. The desired frictional coupling and torque transfer between the components of the clutch brake assembly 10 may be adjusted by the variation of conventional parameters such as spring thickness, wave height, surface material and finish, and the like. The outer ring member 50 is rotationally coupled to the inner ring member through the lost motion coupling of the lugs 48 and elongated slots 52. Since the inner ring member 42 is rotationally coupled to the drive shaft 12 by the lugs 44, the clutch brake assembly 10 slows the rotating elements of the transmission 16, thereby facilitating gear ratio selection.

Figure 5:
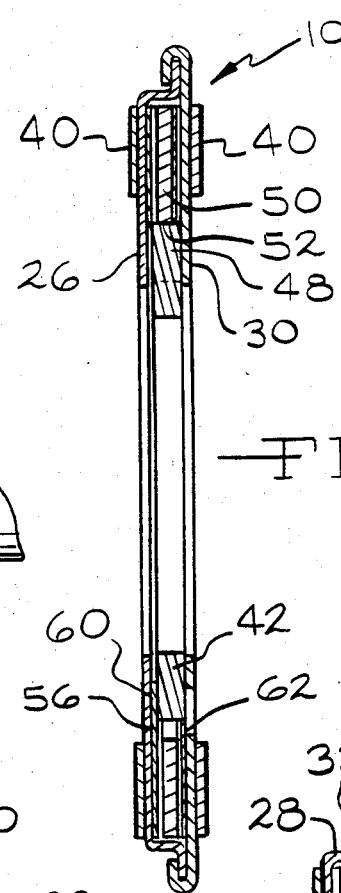
Fig. 5 is an alternative embodiment of the present invention.

Referring now to FIG. 5, a first alternate embodiment 10′ of the clutch brake assembly 10 is illustrated. The alternate embodiment clutch brake assembly 10′ is substantially identical to the preferred embodiment of the clutch brake assembly 10 and thus comprises a first housing member 26 and a second housing member 30 which both include organic outer friction facings 40. Received within the housing members 26 and 30 is an inner ring member 42 and an outer ring member 50 rotationally coupled to the inner ring member 42 through a lost motion coupling consisting of lugs 48 which are received within elongated slots 52. A first wave washer 56 like that utilized in the first embodiment, that is, including inwardly directed tabs 60 is disposed to one side of the ring members 42 and 50. On the opposite side of the ring members 42 and 50 is disposed a second wave washer 62 which is the same in all respects as the first wave washer 56 except that it does not include the inwardly projecting tabs 60. Thus, the second wave washer 62 functions only as a means to frictionally interconnect the outer ring member 50 with the adjacent inner surface of the second housing member 30. It neither contacts nor functions as a means of minimizing or eliminating unwanted axial motion and possible noise generation by the inner ring member 42. The alternate embodiment clutch brake assembly 10′ is preferably utilized wherein drag and torque throughput requirements are greater than those provided by the preferred embodiment clutch brake assembly 10.

The foregoing disclosure is the best mode devised by the inventor for practicing this invention. It is apparent, however, that apparatus incorporating modifications and variations will be obvious to one skilled in the art of clutch brakes. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What I claim is:

1. In a clutch brake assembly having a housing with opposed friction surfaces, a first ring member secured for rotation with a drive shaft, a second ring member rotationally coupled to said first ring member through a lost motion coupling and an axially resilient member disposed between said housing and said second ring member, the improvement comprising tab means extending from said axially resilient member for axially biasing said first ring member.

2. The improvement of claim 1 wherein said axially resilient member is a compression spring.

3. The improvement of claim 1 wherein said axially resilient member is a wave washer.

4. The improvement of claim 1 wherein said tab means includes at least a pair of tabs which extend inwardly to approximately the radial midline of said inner ring member.

5. The improvement of claim 1 wherein said tab means includes at least a pair of parallel tabs transversely offset from an intermediate line of diameter.

6. The improvement of claim 1 wherein said housing includes apertures axially aligned with a portion of said tab means.

7. The improvement of claim 1 wherein said housing defines a pair of opposed apertures for receiving complementarily disposed tabs extending from said axially resilient member.

8. The improvement of claim 1 further including a second axially resilient member disposed within said housing on the opposite side of said second ring member.

9. A clutch brake assembly for disposition on a rotating drive shaft comprising, in combination, a housing having opposed friction surfaces and defining a through passageway for receiving said drive shaft, an inner ring member having means for rotationally engaging said drive shaft while permitting relative axial motion therebetween, an outer ring member rotationally coupled to said inner ring member through a lost motion coupling, and an axially resilient member disposed between said housing and said outer ring member, said resilient member having tab means for axially biasing said inner ring member.

10. The clutch brake assembly of claim 9 wherein said axially resilient member is a compression spring.

11. The clutch brake assembly of claim 9 wherein said axially resilient member is a wave washer.

12. The clutch brake assembly of claim 9 wherein said axially resilient member is a wave washer having four waves.

13. The clutch brake assembly of claim 9 wherein said tab means includes at least a pair of tabs which extend inwardly to approximately the radial midline of said inner ring member.

14. The clutch brake assembly of claim 9 wherein said tab means includes at least a pair of parallel tabs transversely offset from an intermediate line of diameter.

15. The clutch brake assembly of claim 9 wherein said housing includes apertures axially aligned with a portion of said tab means.

16. The clutch brake assembly of claim 9 wherein said housing defines a pair of opposed apertures for receiving complementarily disposed tabs extending from said axially resilient member.

17. The clutch brake assembly of claim 9 further including a second axially resilient member disposed within said housing on the opposite side of said outer ring member.

* * * * *